Patented Apr. 7, 1936

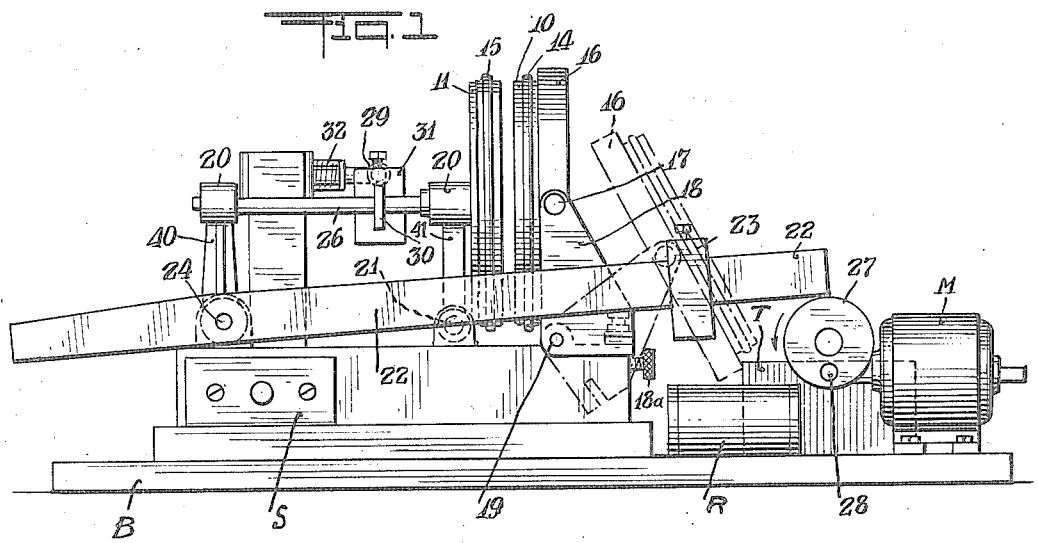
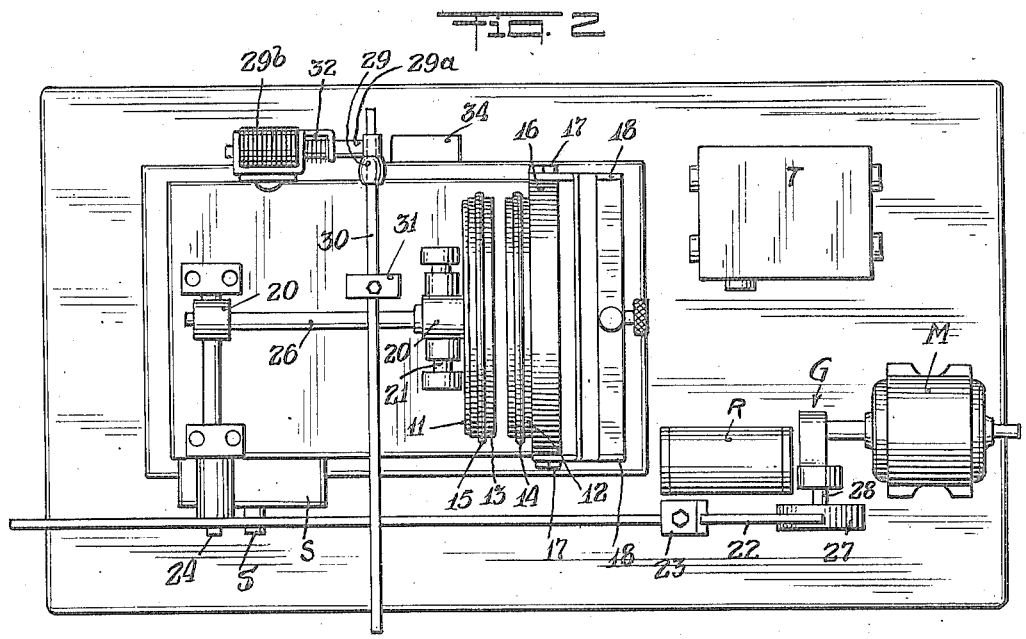

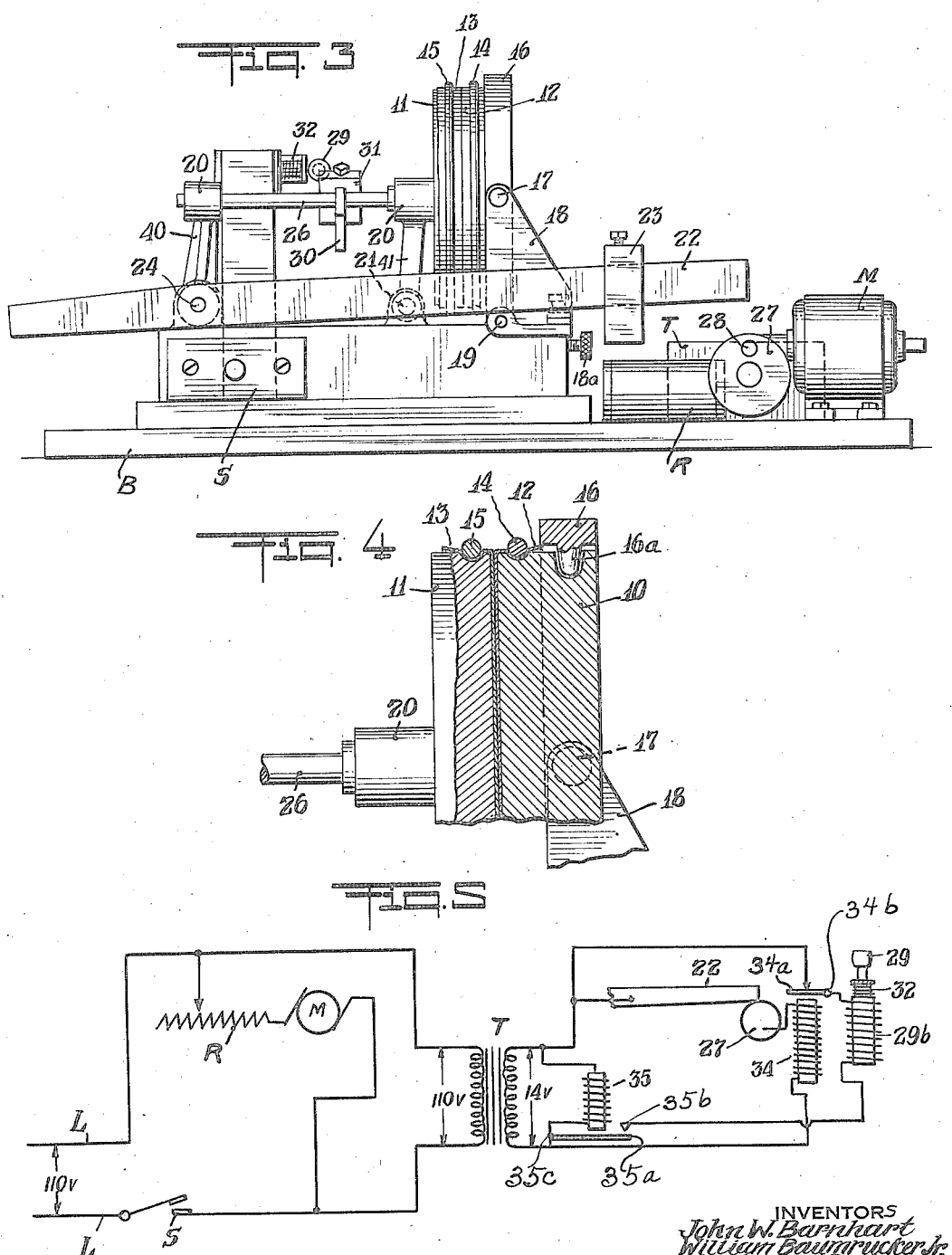

2,036,315

UNITED STATES PATENT OFFICE 2,036,315

APPARATUS FOR DETERMINING THE SURFACE TEXTURE AND FINISH OF VARIOUS MATERIALS

John W. Barnhart, Bronxville, William Baumrucker, Jr., Hempstead, and William G. Dodge, Flushing, N. Y., assignors to News Syndicate Co., Inc., New York, N. Y., a corporation of New York Application February 26, 1934, Serial No. 712,864

6 Claims. (Cl. 265—10)

Our invention relates to a new and improved apparatus for determining the surface texture and finish of various materials (and more particularly paper) by measuring the starting friction of such substances.

One of the objects of our invention is to provide an improved mechanism for testing the surface texture and finish of newsprint paper.

Another object of our invention is to test the surface texture and/or finish of pliable or bendable materials.

Another object of our invention is to provide a mechanism whereby one or more specimens of the material to be tested are subjected to pressure and said sample or samples are simultaneously (or substantially simultaneously) subjected to a force which tends to move the sample against the friction which is produced by such pressure.

While we prefer to press together two specimens of the material which is to be tested, it is to be understood that we could press one specimen of such material against a second surface which may be made of a different material or materials.

Other objects of our invention will be set forth in the following description and drawings which illustrate a preferred embodiment thereof, it being understood that the above statements of the objects of our invention are intended to generally explain the same without limiting it in any manner.

Fig. 1 is a side elevation of the improved apparatus.

Fig. 2 is a top plan elevation of Fig. 1.

Fig. 3 is a view similar to Fig. 1, the parts of the apparatus being shown in a different position.

Fig. 4 is a detail elevation, partially in section.

Fig. 5 is a diagrammatic view of the electric circuit which is utilized in connection with our invention.

The device has any suitable base B having extensions, to which standards 40 and 41 are pivotally connected, by means of the respective pivot pins 24 and 21. Said standards 40 and 41 are provided with bearings 20, in which a shaft 26 is turnably mounted. Said bearings 20 are self-aligning bearings so that when the standards 40 and 41 are rocked, a corresponding longitudinal movement of the shaft 26 is produced, in a direction which is substantially parallel to the axis of said shaft 26. The shaft 26 has a lever or arm 30 mounted thereon, so that the lever 30 and the shaft 26 turn in unison.

An adjustable weight 31 is mounted upon the lever 30 so as to regulate the torque which is exerted by said lever 30 upon the shaft 26.

As shown in Fig. 2, one of the arms of the lever 30 is much longer than the other arm thereof, and the weight 31 is adjusted so as to counterbalance the weight of the longer arm of said lever 30, to any desired degree.

The standard 40 is integral with or it is rigidly connected to a lever 22 which is also mounted upon the pivot member 24. The lever 22 is provided with an adjustable weight 23 and the torque of the lever 22 tends to turn the standard 40 in the clockwise direction, thus imparting a similar turning movement to the standard 41, and a longitudinal movement of the shaft 26 so as to move the parts to the operative position of the device.

The disc 11 is mounted upon the shaft 26, so as to turn and otherwise move in unison with said shaft 26. The test material 13 is clamped or otherwise suitably connected to the disc 11, so that said test material 13 has an even outer face. This may be accomplished by means of the resilient clamping ring 15, which is sprung into the position shown in Fig. 4.

The disc 11 may be about seven inches in diameter, in case it is desired to test a sample of newsprint paper. Said disc 11 is provided with a recess, into which the clamping ring 15 springs. Said clamping ring 15 may be continuous or it may be a split ring.

A companion disc 10 is provided, and the second piece of test material 12 is clamped to the second disc 10, by means of a clamping ring 14 which corresponds to the clamping ring 15. The second disc 10 is turnably mounted in an annular frame 16 which is provided with fingers 16a, which enter corresponding recesses in the second disc 10. The frame 16 is pivotally mounted in a frame 18, by means of pivot pins 17 which pass through holes in said frame 18, and which enter suitable recesses in said frame 16.

The frame 18 is pivotally connected to an extension of the base B, by means of pivot pins 19. Hence the frame 18 can be turned downwardly, to the dotted line position which is shown in Fig. 1, and the frame 16 can be turned in said frame 18, to the dotted line position which is also shown in Fig. 1. In this position the test piece 12 can be conveniently secured to the disc 10, the test piece 13 can be conveniently secured to the disc 11, and the frame 18 can then be turned back to the full line position which is shown in Fig. 1.

The frame 18 is held in the full line position shown in Fig. 1, by any suitable means, such as one or more screws 18a, which are connected to an extension of the base B.

When the device is ready for operation, the discs 11 and 10 are slightly separated from each other, such separation being shown on an exaggerated scale in Fig. 1.

The space between and the adjacent surfaces of the test pieces 12 and 13 may be as small as is desired, and this space can be regulated by suitably designing the apparatus.

One end of the lever 22 is adapted to rest upon the periphery of an eccentric or cam 27 which is turnably mounted at 28, to a suitable extension of the base B. The shaft 28 of the eccentric 27 is given a suitable slow motion by a motor M, through any suitable reduction gearing which is generally designated as G. We can use any suitable worm gearing or other reduction gear, in order to produce the slow turning of the member 27.

When the lever 22 contacts with the high point of the member 27, the disc 11 is held suitably spaced from the companion disc 10. As the cam 27 is turned in the counterclockwise direction, the lever 22 is free to turn in the clockwise direction, until the adjacent surfaces of the test strips 12 and 13 contact with each other, with a pressure which is dependent upon the adjustment and the weight 23 of the lever 22. At this point the lever 22 is held against further turning movement about its pivot 24, and since the cam 27 is caused to turn continuously, said cam loses contact with the lever 22.

As shown in Fig. 2, the arm or lever 30 is held against turning movement, by means of a latch 29, which abuts the top surface of said lever 30. The latch 29 is integral with or it is suitably connected to the plunger 29a of a solenoid 29b. A spring 32 normally holds the latch 29 in its operative position. However, when the solenoid 29b is energized, the member 29a and the latch 29 are moved away from their operative position, so that the lever 30 is then free to turn the shaft 26, and to therefore exert a torque on the test strip 13, relative to the test strip 12.

The disc 10 is held against turning movement in the frame 16, in a direction around the axis of shaft 26, so that the turning of the disc 11 and its associated test strip, relative to the disc 10 and its associated test strip, determines the smoothness and surface texture of the paper which is being tested.

Referring to the circuit diagram shown in Fig. 5, the line current is tapped from the leads L, by means of a switch S. The motor M is connected to the line, by means of a rheostat R. The line is connected to a transformer T which may be of any suitable type, and by means of which the line voltage is lowered.

In the particular embodiment specified herein, it is assumed that the line voltage is 110 volts, and that the secondary coil of the transformer T delivers a voltage of 14 volts.

Referring to Fig. 5, the top terminal of the secondary coil is connected to the lever 22 and said top terminal can also be connected to the back contact 34a of an electro-magnetic relay 34.

When the magnet or relay 34 is de-energized, the back contact 34a contacts with the adjacent contact point, so that the upper end of the secondary coil is connected through said back contact 34a, to one terminal of the solenoid 29b.

Said back contact 34a is pivotally mounted at the point 34b. The other end of the solenoid 29b is connected to the contact point 35b.

A slow-acting relay or electro-magnet 35 is connected across the secondary coil and said slow-acting relay 35 operates an armature 35a which is pivotally mounted at the point 35c. When the armature 35a touches the contact 35b, and the back contact 34a touches its contact point, the circuit of the solenoid 29b is closed so as to move the latch 29 to its inoperative position, thus releasing the lever 30. The upper end of the coil of the relay 34 is connected with the eccentric 27.

The device is normally set into operation, when the lever 22 is in contact with the eccentric 27. While the lever 22 contacts with the eccentric 27, the solenoid 29b must remain de-energized. This is accomplished by the combination of the slow-acting relay 35 and the quick-acting relay 34, because the quick-acting relay 34 operates to move the back contact 34a to the circuit-opening position, before the slow-acting relay 35 operates to move the armature 35a to the circuit-closing position. The member 34a is biased into contact-making position.

The relay 34 is connected to the secondary coil, as long as the lever 22 contacts with the eccentric 27. Hence, when the switch is closed, the circuit of the solenoid 29b remains open until the eccentric 27 and the lever 22 are separated. The turning movement of the eccentric 27 is sufficiently slow to permit the armature 35a to contact with the point 35b, before said separation is completed. As soon as the lever 22 and the eccentric 27 are separated, the relay 34 is de-energized, the armature 34a springs back into circuit-closing position, and since the armature 35a is then in the circuit-closing position, the circuit of the solenoid 29b is completed so that the lever 30 is released almost immediately after the pressure which is produced by the lever 22 becomes operative.

Hence the relative torque between the test pieces is produced almost immediately after the friction-producing pressure is applied and this is an important feature of our invention because if the test pieces are pressed against each other for a substantial period of time before the torque is exerted, the test is inaccurate, due to changes in the surface condition of the test pieces, which is caused by said pressure.

In order to determine the surface condition of the test piece, a series of tests can be made. The lever or arm 30 can be initially so balanced, as to produce insufficient torque for producing a relative turning movement between the test pieces. The test can be then repeated with a different adjustment of the torque which is produced by the lever 30, until there is a relative slip of predetermined magnitude between the test pieces.

The smoothness of the sample is thereupon determined as a function of the torque, since the friction producing force which is produced by the lever 22, can be maintained constant.

Alternatively the relative smoothness of the sample may be determined by balancing the arm 30 for a predetermined torque and by adjusting the weight 23 on the arm 22 so that the contact pressure is greater than that which will allow relative movement of the discs 10 and 11 when the plunger 29a is withdrawn. This test can then be repeated with a different adjustment of the weight 23 and consequently with different contact pressure, until the point is reached at which there is a relative slip of predetermined magnitude between the test pieces.

This apparatus permits a measurement of the contact pressure required to cause slippage with a predetermined torque, and the smoothness of the sample is measured as a function of the pressure exerted to prevent slippage between the discs. Hence we measure the friction-producing force and the slippage-producing force, since the static friction is measured by the relation between said forces.

While we have shown one form of apparatus, we do not wish to be limited to the details thereof or to the use of electro-magnetic means for applying the torque immediately after the friction producing force is applied, or to the use of mechanical means for pressing the samples against each other.

Likewise while we prefer to produce a relative turning movement between the test pieces, said movement may be of any other character such as rectilinear or the like.

Whenever we refer to a relative movement between test pieces, we wish to include a relative movement between one test piece, and another piece of any suitable material. The time interval between the application of the friction-producing force and the slip-producing force, should not exceed a small fraction of a second.

If desired the lever 30 can be adjusted, by shifting the weight 31, so that a relative slip is produced, immediately upon the release of the latch, in making the first test. Since the torque which is produced by the arm 30 diminishes with the turning thereof (said arm 30 being initially in a horizontal position), the amount of turning can be used for determining the condition of the sample. This system makes it unnecessary to perform more than one test and hence diminishes the effect of pressure in changing the surface condition of the paper or other test material.

It will be noted that the disc 10 has a universal mounting, because said disc 10 turns in unison with the frame 16 about a horizontal axis which is provided by the pivot pins 19, and the disc 10 can turn relative to the frame 16 about an axis which is perpendicular to the first-mentioned axis, the second turning movement being provided by the pivot pin 16a.

For convenience the member 10 may be designated as an abutment against which the piece of test material is pressed, since said member 10 can be made of any desired material, and the test piece 12 could be eliminated.

We have shown a preferred embodiment of our invention, but it is clear that numerous changes and omissions can be made without departing from its spirit.

We claim:

1. A test machine of the type described comprising a mount which is adapted to support a piece of test material, an abutment against which said piece of test material is adapted to be pressed, means including a first movable member movable to cause said piece of test material to be pressed against said abutment, a second movable member mounted to abut said first movable member and movable away therefrom, and means controlled by the separation of said movable members and adapted to urge said test piece to move relative to said abutment while retaining contact therewith.

2. A test machine of the type described comprising a mount which is adapted to support a piece of test material, an abutment against which said piece of test material is adapted to be pressed, means including a first movable member movable to cause said piece of test material to be pressed against said abutment, a second movable member adapted to abut said first movable member and to be moved away therefrom, and means controlled by the separation of said movable members and adapted to urge said test piece to turn relative to said abutment while retaining contact therewith.

3. A machine of the type described comprising a mount adapted to support a piece of material to be tested, an abutment against which said piece of material can be pressed, means including a first movable member adapted to cause the movement of said mount so that said piece of test material is pressed against said abutment, and automatic means controlled by said movable member upon cessation of movement of the same to cause said test material to move relative to said abutment while retaining contact therewith.

4. In a machine of the type described, a mount adapted to support a piece of material to be tested, an abutment against which said piece of material is adapted to be pressed, means including a first movable member adapted to cause said mount to be pressed against said abutment, a second movable member adapted to contact with said first movable member and to be moved away therefrom, an electric circuit which is controlled by said movable members, a device for producing a movement of said test piece relative to said abutment while the test piece and abutment remain in contact, said electric circuit controlling said device and permitting the operation thereof when said members are separated.

5. A device of the type described comprising a mount adapted to support a piece of the material to be tested, an abutment against which said piece is adapted to be pressed, means including a first movable member adapted to cause the movement of said mount so that said test piece is pressed against said abutment, a second movable member adapted to abut and to be moved away from the first movable member, a device adapted to cause movement of said test piece relative to said abutment while the test piece and abutment remain in contact, a control member for said device, electro-magnetic means for actuating said control member, the circuit of said electro-magnetic means including the armature of a quick-acting relay which operates to move said armature to the circuit-opening position, said relay being connected to the source of current through said movable members when they are in contact, a slow-acting relay connected to the source of current, said slow-acting relay having an armature which is moved by said relay to a position in which it connects one side of said electro-magnetic means to a terminal of the source of power.

6. A device of the type described comprising a shaft, a mount located on said shaft and turnable therewith and adapted to support a piece of material to be tested, an abutment against which said piece of material is adapted to be pressed, said abutment being non-turnable around the axis of said shaft, supporting means for said shaft and adapted to permit the movement of said shaft in a direction parallel to its axis, a first lever adapted to actuate said supporting means so that the test piece is pressed against said abutment, an eccentric adapted to support said first lever and to move away therefrom, mechanism for turning said eccentric, a torque-producing lever mounted on said shaft, a latch for holding said torque-producing lever, an electro-magnetic device for actuating said latch, a quick-acting relay, a slow-acting relay, one terminal of said electro-magnetic device being connected to a terminal of the source of power through the armature of the quick-acting relay, said armature remaining in circuit-closing position when the quick acting relay is de-energized, the other terminal of the electro-magnetic device being connected to the other terminal of the source of power through the armature of the slow-acting relay, said armature remaining in circuit-opening position until the slow-acting relay is energized, a switch for opening and closing the source of power, said eccentric being turned at a speed which is sufficiently low to permit said slow-acting relay to move its armature to the circuit-closing position before said eccentric leaves said first lever, said quick-acting relay having one terminal thereof connected to a terminal of the source of power, the other terminal of the quick-acting relay being connected to the other terminal of the source of power through said eccentric and through said first lever.

JOHN W. BARNHART.
WILLIAM BAUMRUCKER, Jr.
WILLIAM G. DODGE.